(12) United States Patent
Laube

(10) Patent No.: US 10,989,084 B2
(45) Date of Patent: Apr. 27, 2021

(54) EXHAUST GAS SYSTEM WITH PRECONDITIONING

(71) Applicant: Dr. Ing. h.c. F. Porsche Aktiengesellschaft, Stuttgart (DE)

(72) Inventor: Thomas Laube, Leonberg (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 16/698,784

(22) Filed: Nov. 27, 2019

(65) Prior Publication Data

US 2020/0165949 A1 May 28, 2020

(30) Foreign Application Priority Data

Nov. 27, 2018 (DE) .................... 10 2018 129 955.9

(51) Int. Cl.
| | |
|---|---|
| *F01N 3/20* | (2006.01) |
| *F01N 3/30* | (2006.01) |
| *F01N 3/32* | (2006.01) |
| *F01N 9/00* | (2006.01) |
| *F02B 37/00* | (2006.01) |
| *F02B 37/10* | (2006.01) |

(52) U.S. Cl.
CPC ......... *F01N 3/2006* (2013.01); *F01N 3/2013* (2013.01); *F01N 3/306* (2013.01); *F01N 3/323* (2013.01); *F01N 3/326* (2013.01); *F01N 9/00* (2013.01); *F02B 37/00* (2013.01); *F02B 37/10* (2013.01); *F01N 2240/16* (2013.01); *F01N 2410/00* (2013.01)

(58) Field of Classification Search
CPC ...... F01N 3/2006; F01N 3/2013; F01N 3/306; F01N 3/323; F01N 3/326; F01N 9/00; F01N 2240/16; F01N 2410/00; F02B 37/00; F02B 37/10
See application file for complete search history.

(56) References Cited

U.S. PATENT DOCUMENTS

| | | | |
|---|---|---|---|
| 8,899,025 B2 * | 12/2014 | Soukhojak | F28D 20/023 60/287 |
| 2018/0291827 A1 * | 10/2018 | Disaro' | F01N 3/2066 |
| 2020/0109675 A1 * | 4/2020 | Han | B60W 10/06 |

FOREIGN PATENT DOCUMENTS

| | | | |
|---|---|---|---|
| DE | 10 2014 017 160 | 6/2015 | |
| DE | 10 2018 107 743 | 10/2018 | |
| DE | 10 2017 213 004 | 1/2019 | |
| GB | 2254014 A * | 9/1992 | ........... F01N 3/2013 |

* cited by examiner

*Primary Examiner* — Audrey K Bradley
(74) *Attorney, Agent, or Firm* — Gerald E. Hespos; Michael J. Porco; Matthew T. Hespos

(57) ABSTRACT

A method and a corresponding apparatus are provided for preconditioning an exhaust gas system (100) for discharging and purifying combustion exhaust gases of an internal combustion engine (1), in particular an internal combustion engine (1) of a motor vehicle (200). The method includes operating, air being heated by a heating element (8) in the exhaust gas system (100) to heat air in the exhaust gas system (100), operating a fan in the exhaust gas system (100) for producing a hot air stream with the heated air, using the hot air stream for heating a first catalytic converter (7) of the exhaust gas system (100) to a minimum operating temperature.

16 Claims, 1 Drawing Sheet

EXHAUST GAS SYSTEM WITH PRECONDITIONING

CROSS REFERENCE TO RELATED APPLICATION

This application claims priority under 35 USC 119 to German Patent Appl. No. 10 2018 129 955.9 filed on Nov. 27, 2018, the entire disclosure of which is incorporated herein by reference.

BACKGROUND

Field of the Invention

The invention relates to a method for preconditioning an exhaust gas system for discharging and purifying combustion exhaust gases of an internal combustion engine, in particular an internal combustion engine of a motor vehicle, to a method for operating an exhaust gas system of this type, to an exhaust gas system and to a motor vehicle.

Related Art

In the course of the constant optimizations for lowering the pollutant emissions in internal combustion engines, the three-way catalytic-convertor in gasoline engines and the oxidation catalytic converter in diesel engines in conjunction with an SCR exhaust gas aftertreatment system represents the prior art. In addition, particulate filters are used to decrease the soot emissions, which particulate filters are already the standard in diesel vehicles and are also to be found increasingly in gasoline applications. The focus of the invention described here lies on the gaseous pollutants, that is to say the hydrocarbons (HC), the carbon monoxide (CO) and the nitrogen oxides (NOx). In the case of the gasoline engine, the oxidation of HC and CO to form $CO_2$ and $H_2O$ and the reduction of NOx to form $N_2+O_2$ takes place at the same time in the case of what is known as the three-way reaction. In the case of diesel systems, virtually only a two-way reaction, namely the oxidation of HC and CO to form $CO_2$ and $H_2O$, takes place on account of the considerable excess air in the oxidation catalytic converter. In contrast, the NOx reduction takes place substantially in the SCR catalytic converter with the addition of a reducing agent, for example aqueous urea solution.

The three-way and oxidation catalytic converters are of fundamentally identical construction. They consist of one or more ceramic carrier matrices with a very large number of small channels, onto the surface of which a highly porous ceramic coating (what is known as the washcoat) is applied, which coating again increases the surface area considerably. The actual chemical catalysts (the precious metals platinum, palladium and rhodium) are embedded in said washcoat. An operationally warm three-way catalytic converter converts more than 99.9% of the gaseous pollutants into the harmless reaction products. In order that the reaction can take place, a minimum operating temperature of the catalytic converters is necessary. Here, this is called what is known as the light-off temperature which is approximately 300° C. Below said temperature, the reaction does not proceed or proceeds incompletely. The heating of the catalytic converters usually takes place directly by means of the combustion exhaust gas. This means that, in the first seconds after the engine start before the light-off temperature is reached, the combustion exhaust gases leave the catalytic converter in a partially unconverted state. More than 80% of the pollutants in the test cycle are produced directly after the engine start before the light-off temperature is reached. The aim of the previous development was therefore to shorten said start-up time to a minimum, that is to say the time until the light-off temperature is reached. This has been achieved substantially by way of the following four approaches:

Approach 1. Reduction of the thermal losses by way of the positioning of the exhaust gas aftertreatment devices as close to the engine as possible and/or insulation of the exhaust gas components.

Approach 2. Lowering of the light-off temperature by way of chemical optimization of the catalytic converter coatings and precious metal compositions.

Approach 3. Improvement of the thermal transfer from the exhaust gas to the catalytic converter by way of optimization of the catalytic converter incident flow by way of CFD simulation.

Approach 4. Increasing of the enthalpy in the exhaust gas by way of special operating modes of the engine, what is known as catalytic converter heating.

It can be seen that said conventional measures will no longer be sufficient for achieving future emissions standards. Moreover, disadvantages for other operating points also result from the approaches. Approach 1. has, for example, the consequence that the component temperatures increase greatly during high load operation. The component protection measures which are taken lead as a rule to a rise in the CO2 emissions. The same applies to approach 4. which likewise causes increased CO2 emissions during catalytic converter heating operation.

An aim of the invention that is described in the following text includes conditioning the exhaust gas aftertreatment device by way of an external heating apparatus in such a way that the light-off temperature is already reached when the engine is started and an immediate conversion of the exhaust gases takes place.

In accordance with the prior art, catalytic converter heating apparatuses are known, in the case of which an exhaust gas aftertreatment device (as a rule, a metal catalytic converter) is heated by means of an electric heating element by way of heat conduction and convection. A disadvantage of systems of this type is the heating performance which is limited on account of the existing 12 volt on-board voltage system or, in the case of sufficient heating performance, the necessity of a high voltage on-board power system and the associated additional outlay. Furthermore, solutions are known, in the case of which convective heating of the catalytic converter is achieved by means of a flame using a burner that is operated with the fuel of the vehicle. However, the burner flame itself causes emissions that disadvantageously are greatly dependent on the vehicle fuel that is used.

It is an object of the invention to provide a method for preconditioning an exhaust gas system, which method does not have the above-described disadvantages of the prior art and requires only a very small amount of heating energy.

SUMMARY

The invention relates to a method for preconditioning an exhaust gas system for discharging and purifying combustion exhaust gases of an internal combustion engine, in particular an internal combustion engine of a motor vehicle. The method includes using a heating element in the exhaust gas system to heat air, using a fan to produce a hot air stream in the exhaust gas system with the heated air by a fan, heating a first catalytic converter of the exhaust gas system to a minimum operating temperature by the hot air stream.

The invention also relates to an apparatus that makes it possible, without starting the internal combustion engine, to heat the catalytic converter, that is to say the exhaust gas purification system, by way of a hot air stream, and thus to bring the catalytic converter to the minimum operating temperature, that is to say the light-off temperature. The first catalytic converter will also be called the starting catalytic converter in the following text.

The heated air may be circulated in the exhaust gas system to heat the first catalytic converter and is not discharged out of the exhaust gas system until the minimum operating temperature is reached. The exhaust gas system may be closed by a valve on the tailpipe side, and the exhaust gas system may be closed on the engine side by way of a closed position of the exhaust gas valves of the internal combustion engine and/or by way of a further valve. Thus, the hot air stream circulates as in a wind tunnel and considerably less heating and fan performance have to be expended. The hot air remains within the exhaust gas system and does not escape to the outside through the tailpipe.

An electrically assisted exhaust gas turbocharger may be utilized as a fan. This makes it possible to produce the hot air stream without the necessity of the installation of an additional apparatus. The costs, weight and manufacturing complexity can therefore be kept low.

The hot air stream may be conducted in a circuit through the fan and through the first catalytic converter. The hot air stream may be conducted to this end through a bypass line, with a bypass valve being opened at least partially to conduct the hot air stream through the bypass line. Thus, the hot air stream is utilized very efficiently. A possibility is provided for circulation of the heated air through the bypass line. It is possible by way of the bypass valve to open, to close and preferably to partially open the bypass line depending on the requirement made of the exhaust gas system.

An electrically operated heating element may be used as a heating element. Electrically operated heating elements are efficient, reliable, easily controllable, and do not produce any exhaust gases that would have to be repurified.

The temperature of the exhaust gas/air may be monitored by a temperature sensor, and/or the temperature of the hot air stream may be monitored by the temperature sensor, the fan and/or the heating element being controlled on the basis of temperature data of the temperature sensor. This makes a direct check of the preconditioning possible. It is conceivable that the temperature data are monitored by an engine control unit, and that a start of the internal combustion engine is enabled as soon as the first catalytic converter has reached the minimum operating temperature.

The exhaust gas turbocharger may be operated as a fan with a flow direction that is reversed for operation as a charge air compressor. In this way, an advantageous flow of the heated air is produced.

The invention also relates to a method for operating an exhaust gas system for discharging and purifying combustion exhaust gases of an internal combustion engine, in particular an internal combustion engine of a motor vehicle, with the exhaust gas system being operated in a preconditioning mode in a preconditioning step in the case of a switched off internal combustion engine. The exhaust gas system then may be operated in a normal operation step after the preconditioning step, with the heating element and the fan being switched off and the internal combustion engine being started. This method for operating the exhaust gas system makes efficient and energy-saving preconditioning of the exhaust gas system possible before driving operation of the motor vehicle.

The valve may be opened between the preconditioning step and the normal operation step. This makes driving operation with a switched-on internal combustion engine possible.

The heating element may be switched on in the normal operation mode to heat a second catalytic converter to a minimum operating temperature of the second catalytic converter, and the heating element then may be switched off when the minimum operating temperature of the second catalytic converter is reached. This makes the heating of the second catalytic converter possible in an advantageous way. Therefore, no further heating apparatus is necessary for heating the second catalytic converter, but rather the heating apparatus also is used for producing the hot air stream for heating the first catalytic converter. The temperature of the second catalytic converter may be monitored by way of a further temperature sensor, and the heating element may be controlled on the basis of temperature data of the further temperature sensor.

The bypass valve can be utilized as an external wastegate of the exhaust gas turbocharger, with combustion exhaust gases being conducted out of the internal combustion engine through the bypass line past the exhaust gas turbocharger and past the first catalytic converter in the case of an open bypass valve. A boost pressure that is produced by the exhaust gas turbocharger may be regulated via a degree of opening of the bypass valve. This makes an effective operation of the exhaust gas system possible when driving using the internal combustion engine. The vehicle can be driven in pure normally aspirated engine operation, if the bypass valve is completely open and the combustion exhaust gas is guided past the exhaust gas turbocharger and past the first catalytic converter. In this way, the path of the combustion exhaust gases is de-restricted. It is conceivable that a wastegate is arranged upstream of the exhaust gas turbocharger, with the result that, in the case of a closed turbocharger valve, the combustion exhaust gases flow exclusively through the bypass line and not through the exhaust gas turbocharger and the first catalytic converter.

The operating temperature of the first catalytic converter may be monitored by the temperature sensor in the normal operation mode. The bypass valve is opened, the outlet valve is closed, and the heating element and the fan are activated if the operating temperature of the first catalytic converter drops below a minimum operating temperature of the first catalytic converter. This makes it possible to keep the first catalytic converter warm. This may be necessary in the case of hybrid vehicles if the vehicles drive exclusively electrically for a relatively long time.

The invention also relates to an exhaust gas system for discharging and purifying combustion exhaust gases of an internal combustion engine, in particular an internal combustion engine of a motor vehicle. The exhaust gas system has an exhaust gas manifold for receiving the combustion exhaust gases from the internal combustion engine. More particularly, the exhaust gas system of this embodiment has a fan, a first catalytic converter, a heating element for heating air, a first line section, a second line section, a third line section and a bypass line. The first catalytic converter has a catalytic converter outlet. The exhaust gas manifold is connected to the first line section. The second line section, the fan, the first catalytic converter and the catalytic converter outlet are connected to form a first exhaust gas path between the first line section and the third line section. The bypass line forms a second exhaust gas path between the first line section and the third line section. The first exhaust gas path and the second exhaust gas path form a circuit. The exhaust gas system can carry out the above-described methods for preconditioning the exhaust gas system and/or for operating the exhaust gas system, and has all advantages of these methods.

A valve for closing the third line section may be arranged on the third line section. This makes it possible to close off the exhaust gas system on the tailpipe side in such a way that preconditioning of the exhaust gas system using heated air is possible without the heated air exiting from the exhaust gas system.

A bypass valve for closing the bypass line may be arranged on the bypass line and can set the degree of opening of the bypass valve. This makes it possible to switch the bypass line on and off. Thus, the bypass valve can advantageously serve as an external wastegate of an exhaust gas turbocharger.

The fan may be an electrically assisted exhaust gas turbocharger. In this way, an exhaust gas turbocharger that already is installed in the exhaust gas system is used instead of a dedicated component for the fan, thereby reducing costs, weight and manufacturing outlay.

The third line section may be connected to a second catalytic converter. The second catalytic converter may be referred to as the main catalytic converter in the following text and functions for further exhaust gas treatment.

The exhaust gas system may have a temperature sensor, and the temperature sensor may be arranged on the first catalytic converter. The temperature sensor may be configured for detecting the temperature of the exhaust gas/air. By way of the temperature sensor, it is possible to control the fan and the heating device on the basis of temperature data that relate to the operating temperature of the first catalytic converter.

A further valve for closing the first line section is arranged on the first line section. This makes it possible to prevent heated air from flowing out of the exhaust gas system into the internal combustion engine.

The invention also relates to a motor vehicle having an embodiment of the above-described exhaust gas system.

The invention further relates to a method for operating the motor vehicle.

Further details, features and advantages of the invention result from the drawings and from the following description of embodiments using the drawings. The drawings merely illustrate exemplary embodiments of the invention and do not restrict the scope of the invention.

DETAILED DESCRIPTION

Figure 1:
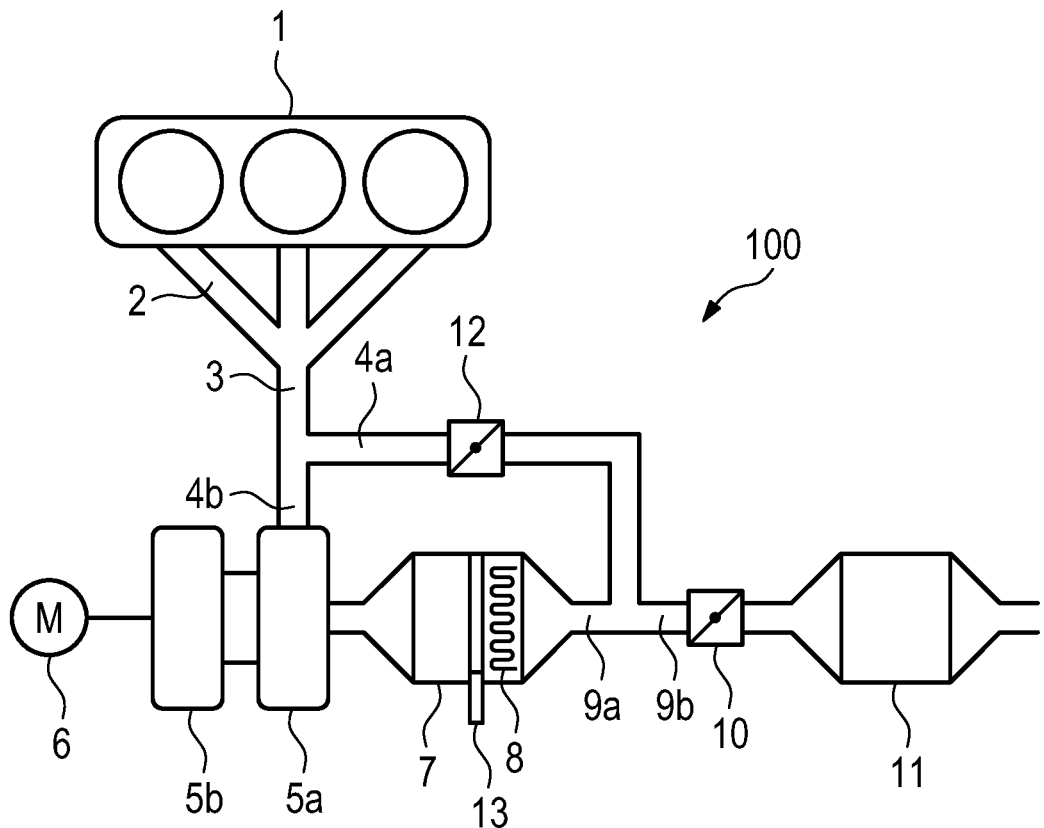
FIG. 1 diagrammatically illustrates the exhaust gas system in accordance with one exemplary embodiment of the present invention.

FIG. 1 diagrammatically shows the exhaust gas system in accordance with one exemplary embodiment of the present invention. In the embodiment which is shown here, the fan is coupled to the electric heating element 8 (hot air drier principle), as a result of which a hot air stream is produced which heats the catalytic converter monolith of the first catalytic converter 7 (also called the starting catalytic converter 7 in the following text) to approximately 300° C. in a convective manner. In order for it to be possible for merely as little thermal energy and fan performance to be expended as possible, the air is circulated continuously within the exhaust gas system 100 as in a wind tunnel.

The internal combustion engine 1 is adjoined by the exhaust gas manifold 2 which merges the combustion exhaust gases of a plurality of cylinders of a cylinder bank of the internal combustion engine 1 and feeds them to the first line section 3. The first line section branches into the second line section 4b and the bypass line 4a. The first line section 4b opens into a turbine housing with the turbine 5a of the exhaust gas turbocharger 5a, 5b. The exhaust gas turbocharger 5a, 5b is configured as an electrically assisted exhaust gas turbocharger and is indicated by way of the electric motor 6 arranged on a turbocharger shaft. The turbine 5a is adjoined by a first exhaust gas aftertreatment device (here, the starting catalytic converter 7). The heating element 8 is arranged on the starting catalytic converter 7, which heating element 8 is preferably but not necessarily arranged in a common housing with the starting catalytic converter. Following the direction of an exhaust gas stream, the catalytic converter outlet 9a branches into the bypass line 4a and the third line section 9b. The bypass line 4a represents a bypass around the exhaust gas turbocharger 5a, 5b and the starting catalytic converter 7. The bypass valve 12 is arranged within the bypass line 4a. The valve 10 is arranged on the third line section 9b, which valve 10 is followed in the direction of the combustion exhaust gases by the second catalytic converter 11 (called the main catalytic converter 11 in the following text). The temperature sensor 13 monitors the temperature of the circulating air and regulates the heating performance of the heating element 8.

The bypass valve 12 is opened completely and the valve 10 is closed completely for preconditioning of the exhaust gas system 100. The aim is the production of a circulating air mass stream with continuous feeding of heating energy independently of the operation of the internal combustion engine 1 for convectively heating the starting catalytic converter 7 and all further gas-conducting components of the exhaust gas system 100. The exhaust gas turbocharger 5a, 5b is operated by way of the electric motor 6 counter to the actual flow direction during operation of the internal combustion engine 1. As a result, the turbine 5a of the exhaust gas turbocharger 5a, 5b becomes an electric high temperature-resistant fan which produces the desired hot air stream. Although the efficiency is low, the required mass stream is also considerably lower in comparison with the operation of the internal combustion engine 1. In addition, the losses pass as dissipated energy in the form of heat into the exhaust gas system 100, and therefore do not represent losses within the context of the objective of the present invention. The air which is situated in the exhaust gas system 100 is conveyed in the clockwise direction in the present illustration by way of the turbine 5a of the exhaust gas turbocharger 5a, 5b, and passes through the second line section 4b, the bypass line 4a and the catalytic converter outlet 9a to the heating element 8. During the throughflow, the air mass stream is heated convectively and subsequently outputs part of its energy to the starting catalytic converter 7. Subsequently, the hot air stream passes the turbine 5a of the exhaust gas turbocharger 5a, 5b and also heats said turbine 5a convectively. Afterward, the cycle starts over. On account of the closed valve 10, the hot air stream remains "trapped". Two strategies can be followed in order to avoid a return flow of the hot air stream into the cylinder head of the internal combustion engine 1. Either a further valve (not shown) is inserted into the first line section 3 to avoid the return flow, or the internal combustion engine 1 is switched off in such a way that all of the outlet valves of the internal combustion engine 1 are closed during restarting. This can be achieved by way of a corresponding position feedback. As a result, the air backs up in the exhaust gas manifold 2, and the hot air stream and the thermal energy are not lost in the direction of the internal combustion engine 1, but rather recirculate in the circuit of the exhaust gas system 100. The convective heat transfer from a gas to a solid body is fundamentally dependent on the heat-exchanging surface area, the thermal capacities and the temperature difference. Within the context of a heating time which is as brief as possible, a maximum heat transfer is desired. An advantage of the described arrangement is that considerably less heating performance has to be expended on account of the closed circuit in the exhaust gas system 100, since, after passing the starting catalytic converter 7, the hot air stream is recirculated again by the turbine 5*a* and is heated further. Thus, the residual thermal energy of the hot air stream that could not be dissipated by convection to the solid bodies remains in the exhaust gas system 100 and does not have to be applied again by way of the heating element 8. As a consequence, the heating time and/or the heating performance can therefore be reduced considerably. In contrast to this, in the case of the known external heating apparatuses (catalytic converter heating disk, burner), the energy is not utilized as efficiently, since, after passing the catalytic converter once, the air mass stream flows in the direction of the muffler system and outputs its residual thermal energy to the muffler system and the environment.

In the case of the heating element 8 and the starting catalytic converter 7, the circumstance is utilized that they in each case have very large surface areas (similar to those of heat exchangers). This means that a comparatively high convective heat transfer is produced. In contrast, the surface areas of the exhaust gas pipes of the exhaust gas system 100 and the turbine 5*a* are comparatively small. As a consequence, the turbine 5*a*, the exhaust gas pipes and the exhaust gas manifold 2 will heat up much more slowly than the starting catalytic converter 7. Nevertheless, thermal conditioning, that is to say heating, will also be produced here in a manner that is dependent on the heating performance and the fan mass stream. This heating leads to the combustion exhaust gas from the internal combustion engine 1 cooling to a less pronounced extent on the components in the case of the following start of the internal combustion engine 1 than in the case of a non-preconditioned exhaust gas system. This represents a further advantage of the invention.

To avoid overcritical component-damaging temperatures on the heating element 8 and on the starting catalytic converter 7, the temperature of the circulating air is monitored by means of the temperature sensor 13, and the heating performance is regulated correspondingly. The temperature of the circulating air is likewise sensed by way of the temperature sensor 13.

After the light-off temperature of the starting catalytic converter 7 is reached, the electric motor 6 and the heating element 8 are switched off, and the engine start is enabled via an engine control unit.

In the context of a heating time which is as short as possible, the thermal masses to be heated of the starting catalytic converter 7, the turbine 5*a* and all the exhaust gas pipes are selected to be as small as possible. This has an effect on the dimensioning of the volumetric ratio of the starting catalytic converter 7 to the main catalytic converter 11. Furthermore, at least the starting catalytic converter 7 is insulated thermally against heat losses. The bypass valve 12 is of gastight configuration to prevent exhaust gas slipping past the starting catalytic converter 7. The valve 10 likewise is provided with a merely low leakage to prevent an energy loss from the exhaust gas system.

The invention is particularly useful for hybrid vehicles. Depending on the usage behavior, it can occur in the case of hybrid vehicles that the internal combustion engine 1 does not run over very long time periods, since the motor vehicle 200 is operated electrically. This can lead to the starting catalytic converter 7 cooling below its light-off temperature. In the case of a high-performance request, no exhaust gas conversion or at least insufficient exhaust gas conversion would first of all take place in the starting catalytic converter 7 in the case of a restart of the internal combustion engine 1. To avoid this, the internal combustion engine 1 has to be started according to the prior art. However, in accordance with the invention, heat can be introduced into the starting catalytic converter 7 independently of the internal combustion engine 1, and the exhaust gas system 100 can therefore be kept at a minimum operating temperature. Driving can therefore be carried out in a purely electric manner for longer, and the operational readiness of the exhaust gas aftertreatment devices of the motor vehicle 200 is ensured at the same time.

In one alternative embodiment to that shown here, a further valve is situated in the first line section 3. The further valve is closed for preconditioning the exhaust gas system 100 and therefore prevents a heat loss in the direction of the exhaust gas manifold 2 and the cylinder head. In this case, engine control with closed outlet valves can be dispensed with.

As soon as the starting catalytic converter 7 has reached its minimum operating temperature, the starting of the internal combustion engine 1 is enabled by a control unit, and the valve 10 thus opens completely and the bypass valve 12 closes completely. Starting of the internal combustion engine 1 then takes place.

The flow direction of the combustion exhaust gases through the turbine 5*a* then reverses. The combustion exhaust gas that comes from the internal combustion engine 1 passes the exhaust gas manifold 2, the first line section 3, the second line section 4*b* and finally the exhaust gas turbocharger 5*a*, 5*b*. Subsequently, the throughflow of the starting catalytic converter 7, the heating element 8, and the catalytic converter outlet 9*a* of the third line section 9*b* and the main catalytic converter 11 takes place. Flow does not pass through the bypass line 4.

The starting catalytic converter 7 is already at its minimum operating temperature during engine starting after preconditioning of the exhaust gas system 100, but the main catalytic converter 11 is not. A correspondingly great catalytic converter volume is necessary for the reliable conversion of high mass streams of combustion exhaust gases in the case of high-performance requirements made of the internal combustion engine 1. To bring the main catalytic converter 11 to its light-off temperature as rapidly as possible, the exothermic behavior of the starting catalytic converter 7 is utilized during stoichiometric operation of the internal combustion engine 1 to heat the main catalytic converter 11, which is arranged downstream in the direction of the combustion exhaust gases. This operation can be accelerated by way of the reactivation of the heating element 8. The temperature sensor 13 is used for temperature monitoring. After the light-off temperature of the main catalytic converter 11 is reached, the full engine performance can be enabled. Reaching of the minimum operating temperature of the main catalytic converter 11 can be detected by a further temperature sensor (not shown) downstream of the main catalytic converter 11, or can be stored in a model-based manner in the engine control unit.

After the engine start, the combustion exhaust gases cool on the way from the internal combustion engine as far as the starting catalytic converter 7 due to heat transfers to the cylinder head (not shown) that has not yet been fully heated. Thus, the exhaust gas manifold 2, the pipes of the exhaust gas system 100, and the turbine 5a may reach the starting catalytic converter 7 at a lower temperature than the light-off temperature. In this case, the combustion exhaust gases would cool the starting catalytic converter 7 in an undesirable manner, that is to say would "extinguish" it below the light-off temperature by way of convection. The conversion of the combustion exhaust gases in the starting catalytic converter 7 would therefore no longer be ensured. To avoid this, a certain amount of overheating of the starting catalytic converter 7 above its light-off temperature is a remedial measure during preconditioning to store sufficient thermal energy so that the starting catalytic converter 7 is not cooled excessively by the combustion exhaust gases.

During regular operation of the internal combustion engine 1, that is to say when the starting catalytic converter 7 and the main catalytic converter 11 are heated to temperatures above their respective light-off temperature, the exhaust gas system 100 can preferably be operated at medium engine rotational speeds in such a way that part of the overall combustion exhaust gases is conducted via the turbine 5a and the other part is conducted through the bypass line 4a. The valve 10 is completely open, and the shut-off member (12) is partially open (regulated).

The exhaust gas system 100 can also be operated in a boost pressure regulation operation, however. To this end, the combustion exhaust gas which comes from the internal combustion engine 1 passes the exhaust gas manifold 2 and the first line section 3, and then splits into the second line section 4b and the bypass line 4a. Here, the split of the overall mass stream of the combustion exhaust gas is regulated by means of the further valve 12 by way of throttling of the bypass line 4a. This takes place in an analogous manner with respect to a boost pressure regulation known from the prior art by means of a wastegate valve of an exhaust gas turbocharger. As a consequence, the construction and method of operation of the further valve 12 is very similar to that of a wastegate valve, and the said further valve 12 therefore has a similar internal leakage. The cross section preferably is enlarged, however, in comparison with a wastegate valve from the prior art in order to de-restrict the bypass line 4a.

The second line section 4b and the bypass line 4a accommodate flow-through in parallel by part mass streams of the combustion exhaust gas. The two part mass streams are combined again in the third line section 9b and jointly pass the main catalytic converter 11. This advantageously achieves a situation where the wastegate valve for boost pressure regulation, which is present in the case of every internal combustion engine that is supercharged by way of an exhaust gas turbocharger and is integrated into the turbine housing of the exhaust gas turbocharger, is relocated and enlarged. That is to say, the further valve 12 does not represent an additional component with respect to conventional systems, but rather is merely rearranged and used for a further purpose.

The particular advantages of the arrangement then lie in the flexible regulation possibilities of the exhaust gas mass streams. To this end, three operating modes should be considered, namely: a "Wastegate" operating mode; a "Normally aspirated engine operation" operating mode and a "keeping starting catalytic converter 7 warm" operating mode. These three operating modes are considered in the following two paragraphs.

In the "Wastegate" operating mode, the further valve 12, which can also be called an external wastegate, is used for conventional boost pressure regulation. That is to say, above a defined exhaust gas mass stream of the combustion exhaust gases, it opens precisely to such an extent that the exhaust gas enthalpy supplied by the combustion exhaust gases to the turbine 5a corresponds to the work extracted at the compressor of the exhaust gas turbocharger 5a, 5b. The residual part is conducted past the compressor and the starting catalytic converter 7. The additional advantage of the invention then lies in the fact that exhaust gas-side de-restricting is achieved by way of the wastegate of increased cross section and by way of the bypassing of the starting catalytic converter 7 via the bypass line 4a. As a consequence, the end area and the volume of the starting catalytic converter 7 can be reduced within the context of an optimum starting behavior of the internal combustion engine 1 and a brief time for preconditioning. The conflict of objectives on which the conventional compromise design is based consisting of the starting behavior (small end area and small volume) and the high-performance conversion (great end area and great volume) can therefore be resolved. Accordingly, the main catalytic converter 11 has to be of correspondingly great dimensions, to be capable of conversion in the case of all mass streams which occur. Moreover, the starting catalytic converter 7 is considerably relieved thermally. The combustion exhaust gases that pass the turbine 5a do not constitute any special requirements with regard to the ageing of the catalytic converter coating for the starting catalytic converter 7 due to the lower exhaust gas temperature downstream of the turbine 5a. In contrast, in the case of an arrangement of the catalytic converters very close to the engine in accordance with the prior art, the wastegate mass stream signifies thermal stress for the catalytic coating of said catalytic converters. By way of bypassing of the wastegate mass stream to the main catalytic converter 11, however, the requirement of a high temperature-stable catalytic converter coating for very high mass streams and temperatures is dispensed with for the starting catalytic converter 7. A decisive conflict of objectives can also be resolved here, since an increasing temperature stability of a catalytic converter coating as a rule results in an increase in the light-off temperature. In other words: if the starting catalytic converter 7 no longer has to be of such high temperature-stable configuration, a coating with a lower light-off temperature can be selected. This in turn results in a reduced required time for preconditioning. Since the path from the further valve 12 as far as the main catalytic converter 11 is comparatively long, the combustion exhaust gases can output a large quantity of heat on this path convectively to the exhaust gas pipes of the exhaust gas system 100 and finally to the environment. Here, the consequence is also lower thermal loading and a reduction of the required component protection measures.

In the "Normally aspirated engine operation" operating mode and in the "keeping starting catalytic converter 7 warm" operating mode, the valve 10 is fully open, and the further valve 12 is fully open. In the case of high-performance vehicles with a correspondingly large displacement of the internal combustion engine 1, supercharged operation of the internal combustion engine 1 to overcome the driving resistance is not necessary in most operating states (for example, constant freeway driving). In these states, the internal combustion engine 1 is operated as a normally aspirated engine. Here, those parts of a supercharging unit (5a, 5b) that are situated in the exhaust gas system 100 and the intake system of the internal combustion engine 1 represent throttle points that have a negative influence on the gas exchange of the internal combustion engine 1 operated as a normally aspirated engine (what is known as gas exchange work). The above-described advantage of de-restricting as a result of the enlarged wastegate and the bypassed starting catalytic converter 7 likewise has an effect in normally aspirated engine operation. The operating mode can be utilized until the temperature of the starting catalytic converter 7 just does not fall below the light-off temperature of the starting catalytic converter 7. In a manner that is dependent on models, this can be monitored by way of the engine controller by way of calculations, or can be measured directly using the temperature sensor 13. If a temperature decrease of the starting catalytic converter 7 is detected, the further valve 12 has to be closed (throttled) again to such an extent that a sufficiently large quantity of combustion exhaust gas is conducted through the second line section 4b, the turbine 5a and the starting catalytic converter 7, in order to keep said components warm. Here, the enthalpy of the part mass stream of the combustion exhaust gases which is conducted through the second line section 4b, the turbine 5a and the starting catalytic converter 7 corresponds to the quantity of heat which is output to the environment by way of convection.

Figure 2:
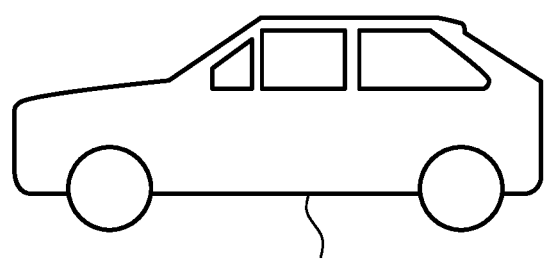
FIG. 2 diagrammatically illustrates the motor vehicle in accordance with one exemplary embodiment of the present invention.

FIG. 2 diagrammatically illustrates the motor vehicle 200 in accordance with one exemplary embodiment of the present invention. The motor vehicle 200 has an exhaust gas system 100 (not shown) according to the invention.

LIST OF DESIGNATIONS

1 Internal combustion engine
2 Exhaust gas manifold
3 First line section
4a Bypass line
4b Second line section
5a Turbine of the exhaust gas turbocharger
5b Exhaust gas turbocharger
6 Electric motor
7 First catalytic converter
8 Heating element
9a Catalytic converter outlet
9b Third line section
10 Valve
11 Second catalytic converter
12 Bypass valve
13 Temperature sensor
100 Exhaust gas system
200 Motor vehicle

What is claimed is:

1. A method for preconditioning an exhaust gas system for discharging and purifying combustion exhaust gases of an internal combustion engine, the method comprising:
heating air by a heating element in the exhaust gas system,
operating an electrically assisted exhaust gas turbocharger in the exhaust gas system as a fan with a flow direction that is reversed for operation as a charge air compressor to produce a hot air stream with the heated air, and
using the hot air stream to heat a first catalytic converter of the exhaust gas system to at least a minimum operating temperature.

2. The method claim 1, further comprising circulating the heated air in the exhaust gas system to heat the first catalytic converter without discharging the exhaust gas until the minimum operating temperature is reached, the circulating being achieved by closing a valve on a tailpipe side, and closing the exhaust gas system on an engine side by closing exhaust gas valves of the internal combustion engine and/or by closing a further valve.

3. The method of claim 2, wherein the step of circulating the heated air comprises conducting the hot air stream in a circuit through the exhaust gas turbocharger and through the first catalytic converter via a bypass line having a bypass valve that is opened at least partially to conduct the hot air stream through the bypass line.

4. The method of claim 1, wherein the heating element is an electrically operated heating element.

5. The method of claim 1, further comprising using a temperature sensor for monitoring the temperature of the first catalytic converter and/or for monitoring a temperature of the hot air stream, and controlling the exhaust gas turbocharger and/or the heating element based on temperature data of the temperature sensor.

6. A method for operating an exhaust gas system for discharging and purifying combustion exhaust gases of an internal combustion engine, comprising:
operating the exhaust gas system in a preconditioning mode by performing preconditioning steps with the internal combustion engine switched off, the preconditioning steps including,
heating air by a heating element in the exhaust gas system,
operating an electrically assisted exhaust gas turbocharger in the exhaust gas system to produce a hot air stream with the heated air,
circulating the hot air stream to heat a first catalytic converter of the exhaust gas system to at least a minimum operating temperature by conducting the hot air stream in a circuit through the first catalytic converter via a bypass line having a bypass valve that is opened at least partially to conduct the hot air stream through the bypass line, the bypass valve being utilized as an external wastegate of the exhaust gas turbocharger;
operating the exhaust gas system in a normal operation mode by performing normal operation steps after the preconditioning steps, the normal operation steps including switching off the heating element and the exhaust gas turbocharger and starting the internal combustion engine; and
conducting combustion exhaust gases out of the internal combustion engine through the bypass line bypassing both the exhaust gas turbocharger and the first catalytic converter in the case of an open bypass valve, and a boost pressure produced by the exhaust gas turbocharger being regulated via a degree of opening the bypass valve.

7. The method of claim 6, wherein the preconditioning steps include closing a valve on a tailpipe side and the method further including opening the valve between the preconditioning steps and the normal operation steps.

8. The method of claim 6, further comprising switching on the heating element in the normal operation mode to heat a second catalytic converter to a minimum operating temperature of the second catalytic converter, and then switching off the heating element when the minimum operating temperature of the second catalytic converter is reached.

9. The method of claim 6, further comprising using a temperature sensor for monitoring the operating temperature of the first catalytic converter in the normal operation mode, and closing the bypass valve if the operating temperature of the first catalytic converter drops below a minimum operating temperature of the first catalytic converter.

10. An exhaust gas system for discharging and purifying combustion exhaust gases of an internal combustion engine, the exhaust gas system comprising:
- an exhaust gas manifold for receiving the combustion exhaust gases from the internal combustion engine;
- a fan;
- a first catalytic converter having a catalytic converter outlet;
- a heating element for heating air;
- a first line section;
- a second line section;
- a third line section;
- a bypass line; and
- a bypass valve arranged on the bypass line and operative for selectively opening and closing the bypass line by a specified amount, the bypass valve being a wastegate;

wherein the exhaust gas manifold is connected to the first line section;
the second line section, the fan, the first catalytic converter and the catalytic converter outlet are connected to form a first exhaust gas path between the first line section and the third line section;
the bypass line is a second exhaust gas path between the first line section and the third line section; and
the first exhaust gas path and the second exhaust gas path form a circuit.

11. The exhaust gas system of claim 10, further comprising a valve arranged on the third line section and operative for closing the third line section.

12. The exhaust gas system of claim 10, wherein the fan is an electrically assisted exhaust gas turbocharger.

13. The exhaust gas system of claim 10, wherein the third line section is connected to a second catalytic converter.

14. The exhaust gas system of claim 10, further comprising a temperature sensor on the first catalytic converter and configured for detecting a temperature of air heated by the heating element.

15. The exhaust gas system of claim 10, comprising a further valve arranged on the first line section and operative for closing the first line section.

16. A motor vehicle having the exhaust gas system of claim 10.

* * * * *